Aug. 2, 1966 T. L. MELL 3,264,541

ANALOG TO DIGITAL PULSE RATE INTEGRATOR AND MOTOR DRIVEN COUNTER THEREFOR

Filed Sept. 20, 1961 3 Sheets-Sheet 1

INVENTOR:
THOMAS L. MELL

BY Howson & Howson
ATTYS

INVENTOR
THOMAS L. MELL
BY Howson & Howson
ATTYS.

INVENTOR:
THOMAS L. MELL
BY Howson & Howson
ATTYS.

United States Patent Office 3,264,541

Patented August 2, 1966

3,264,541

ANALOG TO DIGITAL PULSE RATE INTEGRATOR AND MOTOR DRIVEN COUNTER THEREFOR

Thomas L. Mell, Wayne, Pa., assignor, by mesne assignments, to Compudyne Corporation, Hatboro, Pa., a corporation of Pennsylvania Filed Sept. 20, 1961, Ser. No. 139,520
23 Claims. (Cl. 318—171)

The present invention relates to means for converting voltage to a pulse count representative of the time integral of the voltage. The present invention has to do with the circuitry for producing the pulse frequency and also has to do with a novel counter capable of counting pulses produced at the output of the voltage to pulse frequency converter. It also has to do with a belt weighing system which employs the devices of the present invention.

Techniques employing a D.C. amplifier with capacitive feedback to integrate a D.C. voltage with respect to time are well known. The output of such an amplifier is an analog voltage signal whose maximum amplitude is limited by the amplifier saturation voltage. The maximum time required for such an integrating amplifier to go through one cycle of operation is determined by its circuit and limited to relatively short periods for accuracy and other reasons. If long integrating time intervals longer than one amplifier cycle are desired it has become the practice to reset the integrating amplifier when its output voltage reaches a predetermined amplitude. The number of reset events are then used as a measurement of the time integral of the input voltage.

Two such reset methods are practiced today. According to a first reset method, the integrating amplifier is allowed to increase its output to a predetermined high level at which event the integrating feedback capacitor is discharged to zero or a predetermined lower level and the integrating cycle starts all over.

According to a second reset method the output of the integrating amplifier is allowed to increase to a predetermined high level at which event the input to the integrating amplifier is reversed, causing the amplifier to reverse its output until it reaches a predetermined low level, at which event the original polarity is being restored and the cycle is repeated.

Both reset methods have the inherent disadvantage that the accuracies of these devices depend on a variety of values which are very difficult to control over long periods, such as: amplifier gain, the constancy of the value of the integrating capacitor, filament and power supply voltage, the constancy of the triggering levels, and others.

The present invention has to do with a novel approach to resetting an integrating amplifier. In accordance with the invention the output of said amplifier increases to a predetermined level at which event a pulse of precise amplitude and duration is generated and used to decrease the charge contained in the integrating feedback capacitor by a precise, predetermined amount. The advantage of using this technique to reset an integrating amplifier is that the accuracy of the instrument is determined only by the constancy of the voltage-time quantities contained in the reset pulse and by the feedback and the integrating resistors which can easily be controlled over long periods.

The means for accomplishing the integration is preferably a high gain direct current amplifier with capacitance feedback to form an integrating amplifier. A voltage sensitive pulse source is connected to the output of the integrating amplifier such that upon the occurrence of a particular voltage from the amplifier the pulse source will generate a pulse of predetermined duration and amplitude. The input is fed into the integrating amplifier through a first resistor. The pulse thus generated is fed back into the amplifier through a second resistance. Various means, may be used to achieve the pulse and such means, compositely, generates a rectangular pulse. It is possible to have simultaneously connected separate feedback channels for negative and positive voltage pulses.

The present invention also applies to a modified system for millivolt signals which could not be handled in accordance with the present invention by the device described above. This modified system employs in addition to the integrating amplifier, a phase sensitive D.C. preamplifier having two input and one output terminals, the output of which directly drives the integrating amplifier. This preamplifier amplifies the difference between the input voltage to the entire instrument and a feedback voltage very nearly equal to the input voltage, the magnitude of which is a direct function of the integrating rate of the integrating amplifier.

This latter circuit constitutes a closed loop feedback system with several following advantages. First, millivolt signals can be integrated which cannot be handled by normal integrating amplifiers. Second, the input impedance to the entire instrument is very high and the current drain of the voltage source is very low since said input voltage is opposed by an internally generated voltage of very nearly equal magnitude (millivolt potentiometer action). Third, small, long term drifts, inherent in D.C. amplifiers, are automatically corrected, since a drift would cause a feedback signal to the preamplifier which is not opposed by an input signal and consequently acts as an input signal of opposite polarity.

Finally, the present invention enables the use of a novel pulse counter employing a stepping motor consisting of a two-phase synchronous motor with multiple poles. Although this stepping motor may be used for other purposes in other systems, its value as a pulse counter consists in the fact that, used in connection with a novel circuit, it makes one step of precise angular magnitude each time a pulse is given to the circuit.

For a better understanding of the present invention reference is made to the drawings in which.

Figure 8:
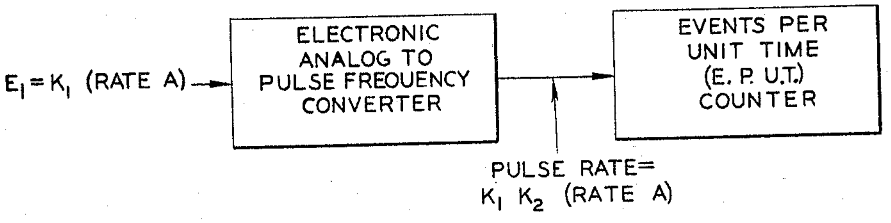
Figure 9:
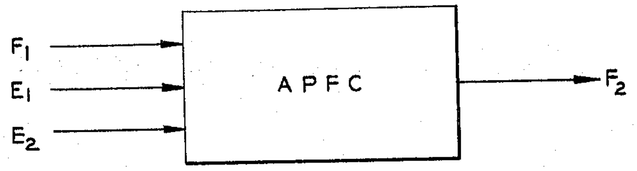
Figures 5, 5A, 6:
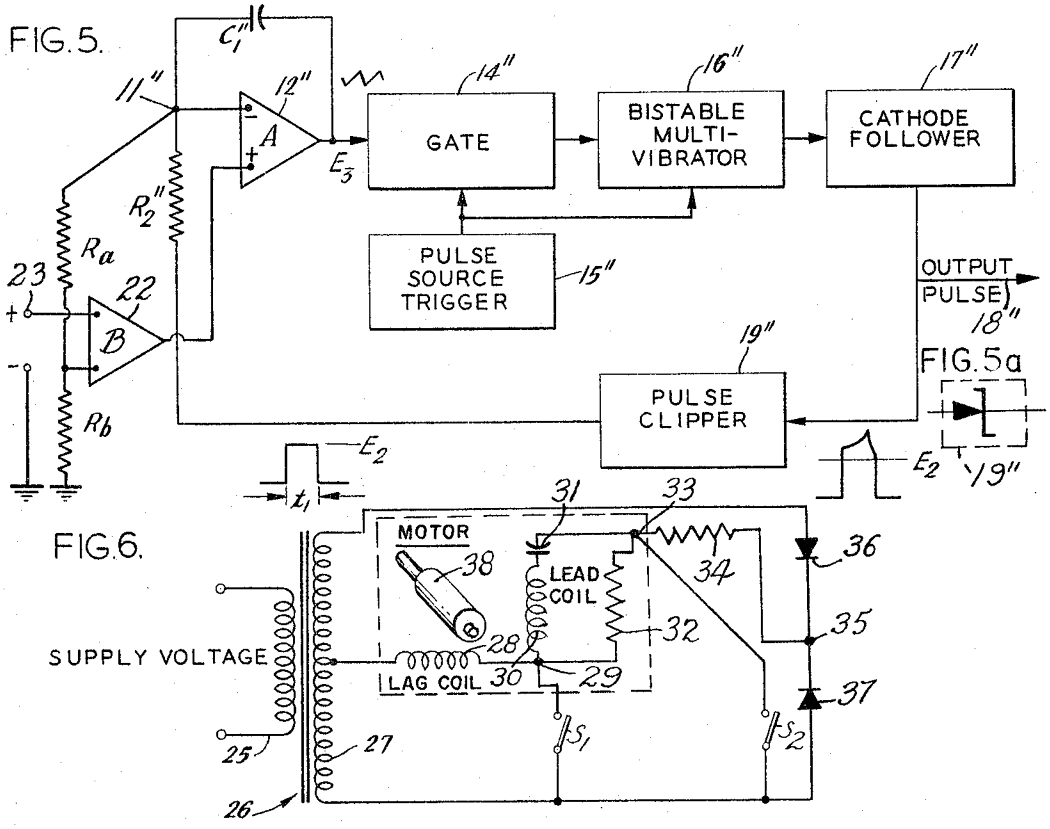
FIG. 5 is a block diagram of a system similar to that of FIG. 2 but showing an additional amplifier circuit for stabilization and pre-amplification of input signals.

FIG. *5a* shows a preferred form of pulse clipper for use in the circuit of FIG. 5;

FIG. 6 is a schematic circuit diagram of part of the synchronous motor and other components used in the pulse counter of the present invention;

FIGS. *7a–7e* represent voltage in various parts of the system of FIG. 6;

FIG. 8 is a block diagram schematically illustrating an average rate meter application of the present invention; and FIG. 9 is a schematic diagram representing broadly another application of the present invention.

Figure 1:
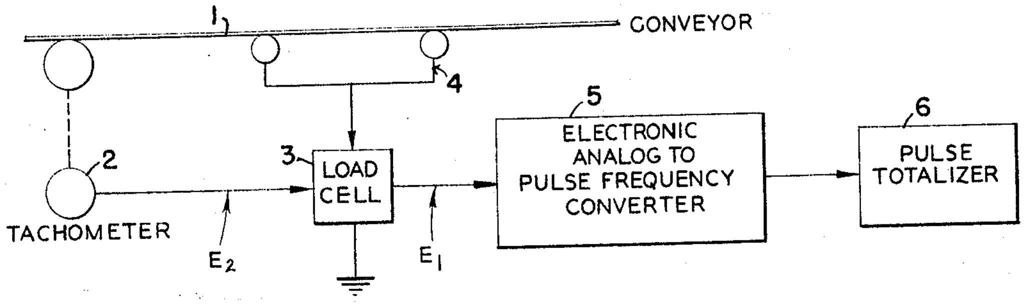
FIG. 1 is a schematic drawing showing a belt conveyor system employing the present invention.

Referring first to FIG. 1, a system is schematically shown therein wherein 1 represents a continuous conveyor carrying, for example, aggregate materials. A tachometer generator 2 produces a voltage output proportional to the speed of the conveyor. A strain gage load cell 3 provides a resistance bridge the output of which is dependent upon the weight of material on the belt above the supporting carriage 4 at a particular time. Voltage from tachometer 2 is fed through and modified by the resistance bridge of load cell 3 and thereby produces a voltage input to electronic voltage analog to pulse frequency converter 5. The output pulses from the voltage to pulse frequency converter are fed to a pulse totalizing counter 6 which may be calibrated in total pounds which passed over the conveyor during a measuring interval, for example.

The tachometer and load cell expedient is commonly used in connection with the conveyor in accordance with the teaching of the U.S. application to Stanley D. Hartshorn, Serial No. 653,707, filed April 17, 1957 and is a technique commonly practiced commercially today.

Figure 2:
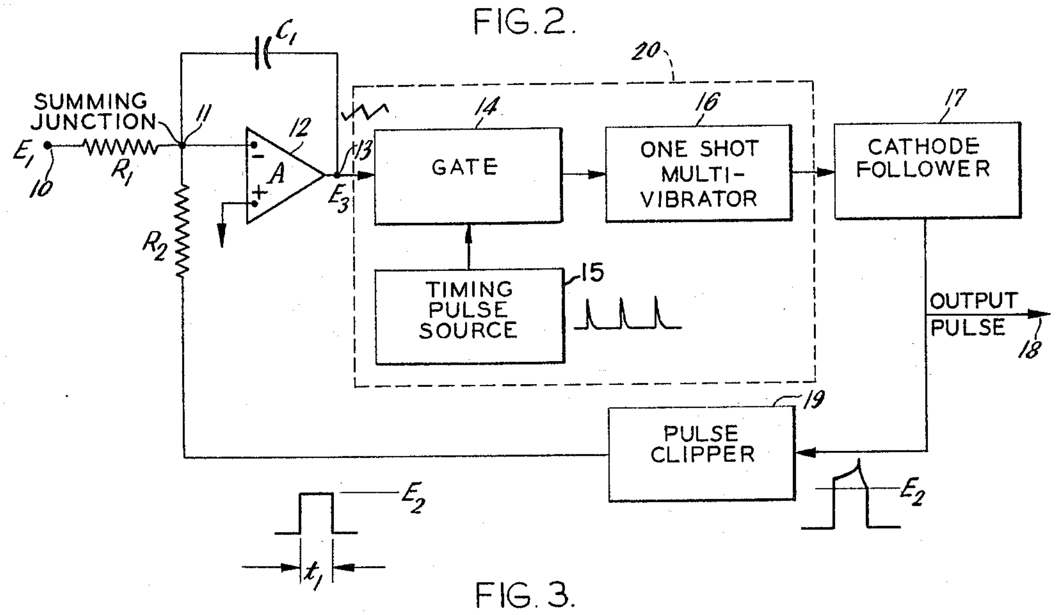
FIG. 2 is a block diagram of the voltage integrator to pulse frequency converter.

FIG. 2 represents a substantial improvement in circuitry providing a pulse count output proportional to the integrated voltage input. Referring to FIG. 2 it will be seen that voltage input, as from the tachometer load cell combination, is applied at terminal 10. This is fed through resistance $R_1$ of a fixed predetermined size to a summing junction 11 which is one of the input terminals of amplifier 12. The other input terminal is connected to ground. The output terminal 13 of integrating amplifier 12 is fed back to summing junction 11 through the integrating capacitor $C_1$ which causes the high gain direct current amplifier 12 to perform the integrating function. Input $E_1$ is assumed to be negative with respect to ground, and accordingly an input voltage causes current to flow from summing junction 11 toward input terminal 10. Such current flow tends to make the potential at 11 go negative, but amplifier 12 recognizes this tendency and opposes it by causing an increasing positive output voltage $E_3$ so that current flows through $C_1$ into the summing junction. By virtue of the high gain of amplifier 12, the current through $C_1$ very nearly equals the current through $R_1$ and hence output voltage $E_3$ very nearly equals the integral of this current. The output of the amplifier is fed to feedback pulse source 20. The feedback pulse source 20 may be any of several types capable of generating a pulse of fixed duration when the voltage $E_3$ increases greater than some positive value. For example, the feedback pulse source may include a mono-stable or one-shot multivibrator 16 which switches its state of conduction when $E_3$ increases past a certain triggering level, and then reverts to its original state of conduction after a certain time period $t_1$ determined by its circuit constants. The feedback pulse is fed through a cathode follower 17 which serves as an impedance changing device before being fed as the output pulse through output 18 to the counter or other suitable device. The pulse generated by multivibrator 16 may not be perfectly rectangular but everywhere is provided with a voltage greater than $E_2$. A pulse clipper 19 is provided to cut the top of the pulse off at voltage $E_2$ which is below the point where the vertical front and rear portions of the pulse are discontinued. The pulse clippers may comprise, for example, a zener diode electrically connected in a reverse biased direction. Alternately, a fixed regulated voltage $E_2$ could be established and the feedback pulse could operate switching means to connect the voltage $E_2$ to the feedback path $R_2$ for the duration of the pulse.

$E_2$ causes a feedback current to flow through $R_2$ into the summing junction 11, the magnitude of the feedback current being substantially greater than the maximum current which input voltage $E_1$ causes to flow through $R_1$. Therefore during a feedback pulse the integrating amplifier 12 will cause reverse current through $C_1$ and hence a decreasing output voltage $E_3$. $E_3$ will decrease at a rate proportional to the difference between $E_2$ and $E_1$.

Figure 3:
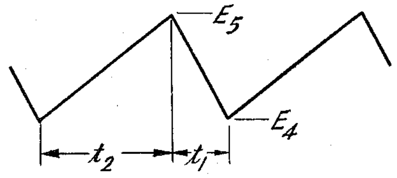
FIG. 3 is a diagram showing a plot of voltage against time of voltage $E_3$.

For further clarification of the operation, reference may be made to FIG. 3, illustrating the output voltage $E_3$ with respect to time. During time $t_2$, the feedback pulse is not connected and a constant input $E_1$ causes $E_3$ to rise at a constant rate, this rate equalling $$\frac{E_1}{R_1C_1}$$

When $E_3$ reaches a predetermined triggering voltage $E_5$, the feedback pulse is generated for time $t_1$, this time being controlled by the feedback pulse generator. During time $t_1$, $E_3$ decreases at a rate equal to $$\left(\frac{E_2}{R_2}-\frac{E_1}{R_1}\right)\left(\frac{1}{C_1}\right)$$

and drops to voltage $E_4$ at the end of $t_1$. Since in the steady state the voltage changes during $t_2$ and $t_1$ must be equal, the following equation must hold:

$$\frac{t_2E_1}{R_1C_1}=t_1\left(\frac{E_2}{R_2}-\frac{E_1}{R_1}\right)\left(\frac{1}{C_1}\right)$$

which may be reduced to $$t_2=t_1\left(\frac{E_2R_1}{R_2E_1}-1\right)$$

The rate of pulse generation, or pulse frequency, then equals $$\frac{1}{t_1+t_2}=\frac{1}{t_1+t_1\left(\frac{E_2R_1}{R_2E_1}-1\right)}$$

This reduces to $$\text{frequency}=\frac{R_2E_1}{t_1E_2R_1}$$

It is particularly important for accuracy that the frequency does not depend on the value at $C_1$ or triggering level $E_5$, but only depends on $E_1$ and the quantities $R_1$, $R_2$, $E_2$ and $t_1$. These quantities may easily be controlled with high precision.

Other useful and novel features of this system are possible by employing a source of timing pulses 15, such as from a power supply, within the feedback pulse source 20 such that feedback pulses start only on the occurrence of a timing pulse. This response may easily be obtained by having gate 14 allow the passage of a timing pulse only when $E_3$ is above the triggering level, and having the multivibrator only operate on receipt of a timing pulse.

One such useful feature is that the feedback pulses are always synchronized with the timing pulses, which feature may be advantageously employed in the counting system described later.

Another useful feature is that the timing pulses may be used to establish the feedback pulse duration $t_1$ for purposes of improved accuracy and for purposes of introducing additional variables into the measurement. In this case the feedback pulse source would be arranged to turn on the feedback pulse on recepit of a timing pulse and turn it off at the next timing pulse, so that $t_1$ equals the interval between successive timing pulses. The multivibrator illustrated may then be the bi-stable type so that it does not by itself revert to the original state, but only so reverts where it received the next timing pulse. If the source of timing pulses is then made a highly stable oscillator, controlled by a crystal or tuning fork, it will be evident that time $t_1$ may be controlled with extreme precision, the power supply line frequency may also be used as a simple and inexpensive source of timing pulses at high precision.

Still other applications arise by intentionally varying the frequency of the timing pulses to introduce another variable into the measurement. When the timing pulses control $t_1$, it is evident that the frequency of feedback pulses is inversely proportional to $t_1$ and hence directly proportional to the frequency of timing pulses. Thus the system may be used to multiply a voltage times a frequency, and produce an output frequency proportional to their product.

Also, the feedback pulse amplitude $E_2$, heretofore considered as a constant regulated valve, may instead be made proportional to a third variable for still greater flexibility in measurement. Then, as illustrated in FIG. 9, a very general application of this system is to produce an output pulse frequency proportional to the product of two variables divided by a third variable. Where $F_2$ is the output pulse frequency, $F_1$ is the frequency of timing pulses, and $E_1$ and $E_2$ are as previously described, $F_2$ will equal $(E_1/E_2)F_1$. Such a device, for example, can serve as a precision frequency divider.

One application of the latter multiplication method is in conveyor weighing where the tachometer of FIG. 1 is the frequency type producing an impulse rate proportional to shaft speed, instead of producing a D.C. voltage. Such tachometers have advantages in accuracy and reliability since they do not contain commutators and the output does not depend on magnetic field strength. It will be evident from the preceding discussion that such a frequency type tachometer can be used as the source of timing pulses, and the load cell of FIG. 1 can be supplied from a constant voltage source. Then the output voltage $E_1$ of the load cell will be proportional to weight only, regardless of belt speed, but the pulse rate output of the converter will correctly be proportional to the product of $E_2$ and the tachometer output frequency, or proportional to speed times weight.

In some applications, it will be most important to provide pulses to totalize the pulses delivered over relatively long periods of time. A particularly advantageous counting method is described later. However, in other applications the pulse rate may be of even greater significance and FIG. 8 illustrates one method of employing the converter for rate indication. The pulses from the converter go to a counter containing an internal timing means such that the counter reads total pulses per integral time. Since the counter totalizes impulses over the time interval referred to, it reads the true integral or average of the input signal during that time, not the instantaneous value at one particular time, a factor of great advantage when measuring signals subject to variations and noise.

Figure 4:
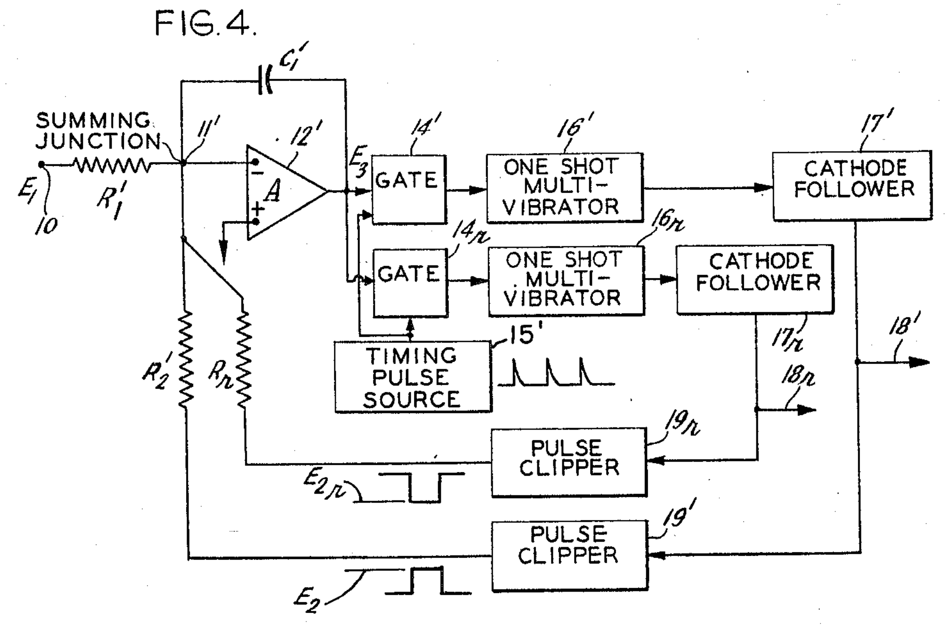
FIG. 4 is a block diagram of a system similar to FIG. 2 but showing both a positive feedback channel and a negative feedback channel.

FIG. 4 illustrates a modified embodiment of FIG. 2 in which both a positive and a negative feedback channel are provided for operation of the converter with positive as well as negative input voltages. Corresponding parts in FIG. 4 are identified by designators corresponding to those in FIG. 2 but having the addition of a prime thereto. As will be seen the output from integrator amplifier is fed to gates 14′ or **14*r*. Each of these channels receive like timing pulses from timing pulse source 15′ and when the voltage reaches the level to open their particular gate will allow a timing pulse to pass through to its own associated one-shot multivibrator 16′ or 16*r*, respectively. The feedback pulse formed thereby is fed through cathode follower 17′ or 17*r* to an output 18′ or 18*r*. The pulse is also fed through a pulse clipper 19′ or 19*r*** then through resistances $R'_2$ or $R_r$ to the summing junction. The reverse feedback pulse $E_{2r}$ is intended to take care of the situation where inverse input voltage is provided. Thus the converter can handle negative as well as positive input voltages and any combination or change of voltages.

Referring now to FIG. 5, a block diagram of a system similar to FIG. 2 is illustrated, but showing an additional input amplifier circuit for stabilization and pre-amplification of input signals as will be explained hereinafter. This system is particularly advantageous in operation with input voltages too small to be properly handled by the system of FIG. 2. Corresponding parts in FIG. 5 are identified by designators corresponding to those in FIG. 2 but having the addition of double primes thereto. In addition to the integrating amplifier 12″ in this case another amplifier 22 is employed. Amplifier 22 is a differential direct current amplifier. One input is applied between ground and terminal 23 directly to one of the input terminals of amplifier 22. The output of amplifier 22 is connected to the non-inverting input terminal of amplifier 12″. The summing junction 11″ is connected back to the second input terminal of amplifier 22 through a voltage divider connecting summing junction 11″ to ground and consisting of resistance divider parts $R_a$ and $R_b$ on opposite sides of the second input terminal of amplifier 22. In this manner the voltage at the second input terminal of amplifier 22 is kept proportional to the voltage at the summing junction.

In the operation of integrating amplifiers of the type previously described, it is well known that a problem in accuracy usually arises due to drifts of the null point of the amplifier. Such drifts will normally be in the magnitude of a fraction of a volt over long periods of time and, if uncorrected, will produce integration, or a steady change in the amplifier output signal, even in the absence of input signals. As is well known, the conventional method of correction for such drifts and errors is to provide a "stabilizing" amplifier to measure the summing junction potential and correct the integrating amplifier rate until that potential is zero. Accordingly such stabilizing amplifiers are normally connected so that the input measures the summing junction potential and the output connects to a second input terminal of the integrating amplifier. The stabilizing amplifier is normally quite slow in response with respect to the integrating amplifier so that it is not effective in response to any fast changes in the summing junction potential, but only tends to correct for slow drifts in the summing junction potential.

When it is necessary to integrate low-level millivolt signals, the conventional approach is to provide still another amplifier ahead of and entirely independent of the integrating amplifier. This pre-amplifier serves to increase the low-level signal to a value at which the integrating amplifier can operate accurately.

The following description covers a novel method of integrating low-level millivolt signals by providing only one amplifier serving the dual purpose of stabilizing and pre-amplification, this method also having other advantages including the provision of voltage signals proportional to the measured variable for retransmission to other devices.

Referring to FIG. 5, it will be noted that amplifier A12″ is connected as an integrating amplifier in the manner previously described. The output of the integrating amplifier operates trigger and pulse forming networks to produce feedback pulses as previously described, these pulses being directed to a summing junction. However, unlike the preceding amplifier, the integrating amplifier in this case has two (2) inputs, one connected to the summing junction and the other connected to the output of a second amplifier B22. Also, the low-level millivolt input signal does not connect to the summing junction but connects to one input of amplifier B, and a connection is made by means of resistors $R_a$ and $R_b$ between the summing junction 11 and the second input of amplifier B.

In the operation of this circuit, amplifier A will attempt to keep its two inputs at equal potentials. If, for example, the positive input is held at a positive potential, amplifier A will attempt to produce an equal positive potential at the summing junction by increasing its output at a constant rate and thus providing a constant current through the integrating capacitor. When feedback pulses occur, the integrating amlifier will still keep the summing junction at this same potential by then producing negative ramp output voltages at a rate sufficient to cause a negative current in the integrating capacitor equal in value to the positive current through feedback resistor $R_1$. Accordingly, the potential at the positive input of the integrating amplifier effectively controls the integrating rate and hence the average number of feedback pulses per unit time, and the summing junction potential holds a smooth value proportional to the integrating rate independent of the presence or absence of feedback pulses.

Resistors $R_a$ and $R_b$ form a voltage divider connected to the summing junction so that the junction of $R_a$ and $R_b$ has a potential exactly proportional to that of the summing junction but of a lower value. The potential at the junction of $R_a$ and $R_b$ thus can be a low-level D.C. millivolts signal exactly proportional to the integrating rate. Amplifier B is then connected to compare the potential at this junction against the input signal representative of the measured variable. This second amplifier is of the polarity sensitive type such that it produces a positive output voltage when the measured variable signal is more positive than the potential at the junction of $R_a$ and $R_b$, and a negative output voltage when its input potentials are in the reverse relationship. The connection of amplifier B output to the positive input of the integrating amplifier then effectively controls the integrating rate at a value exactly proportional to the measured variable signal. If, for example, the measured variable signal increases, amplifier B output will increase in proportion, causing the integrating rate to increase until the summing junction potential is sufficient to restore balance at the input of amplifier B. Similarly, the null operation of amplifier B also corrects for variations in the operating point of amplifier A. If, for example, a drift occurs in amplifier A, such as to increase the integrating rate and hence the summing junction potential, this change will be reflected through the voltage divider to the negative input of amplifier B, causing a decrease in the potential at the positive input of amplifier A and hence causing a correction of the initial effect.

It will be noted that the operation of amplifier B provides essentially a potentiometric system as viewed from the measured variable signal source. That is, a re-balancing effect occurs such that the measured variable signal source is always faced with an equal potential, so negligible current is drawn from the measured variable source and system is substantially independent of the impedance of that source or of the connecting leads. For this purpose, the product of the gain of amplifier B and the voltage divider ratio must be made substantially greater than unity. For example, the voltage divider ratio might be on the order of 1/100th, but the gain of amplifier B would be on the order of 30,000, their product thus being on the order of 300. This figure represents the open loop gain of the regulating system comprising amplifier B and the voltage divider, and is high enough to provide accurate and reliable regulation.

It will be noted that, in view of the open loop gain of approximately 300, any changes tending to change the summing junction potential such as from the occurrence of a feedback pulse would produce corrective action through amplifier B of approximately 300 times the amount produced through amplifier A. To prevent this, the speed of response of amplifier A is made very much slower than that of amplifier A. The time constant of amplifier B may typically be in the order of 10 to 20 seconds. Then, all fast changes such as those produced by feedback pulses will be corrected almost entirely by amplifier A, but all slow changes such as drifts in the level of the first amplifier, and changes in the measured variable signal will be corrected primarily by amplifier B.

In conventional practice, however, amplifier B will normally be of the chopper type to get an accurate and stable null, so its response speed is limited by the chopper operated frequency in any event.

Since amplifier A is required to respond only to fast changes, it is perfectly permissible to insert a high pass filter in its negative input lead, thus preventing the introduction of grid currents from amplifier A into the summing junction. The introduction of such a high pass filter, of course, prevents amplifier A from responding to slow or steady state changes in the summing junction potential, but as previously described such slow changes are corrected by the action of amplifier B.

It will be noted that the summing junction potential is a relatively high level signal in direct proportion to the measured variable signal. For example, the summing junction potential might well have a value of one volt, whereas the measured variable signal might be 1/100th of a volt or less. Thus, the summing junction potential is an amplified signal which may be used to operate other remote devices such as recorders and controllers. As previously described, the summing junction potential is smooth and does not vary appreciably even during the occurrence of feedback pulses.

FIG. 5*a* shows a zener diode as the pulse clipper 19'' in FIG. 5. It may also be substituted for the box 19 in FIG. 2 and each for the boxes 19' and **19*r*** in FIG. 4.

Figure 7A:
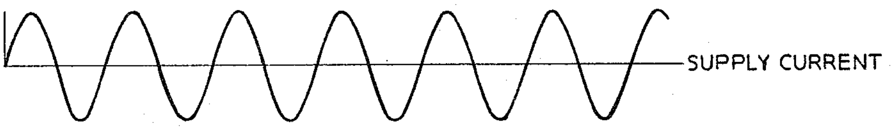
Figure 7B:
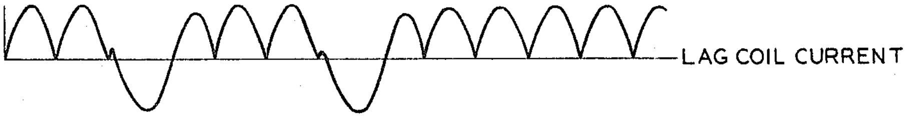
Figure 7C:
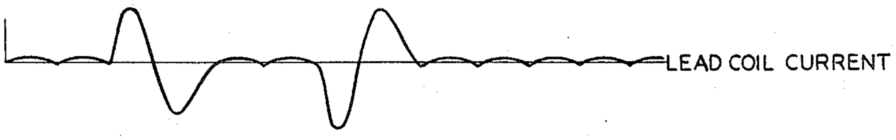
Figure 7D:
Figure 7E:
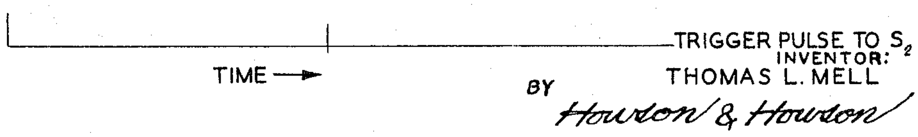

FIG. 6 is representative of a stepping motor which is a two phase, permanent magnet, multiple pole synchronous motor actuated by means of the switches shown $S_1$ and $S_2$. The rotor 38 of this motor is shown schematically. As can be seen in FIG. 6 an alternating current supply voltage is fed to the primary 25 of transformer 26 having a center tapped secondary 27. The shape of the supply voltage is seen in FIG. 7*a* where the polarity is such that current flow is out of the upper lead of secondary 27 for a positive voltage. To the center tap is connected one end of lag winding 28 which is connected at terminal 29 to lead winding 30. Lead winding 30 is in series with capacitor 31, and lead winding 30 and capacitor 31 are by-passed by resistor 32 from terminal 29 to terminal 33. A current limiting resistor 34 is preferably included between terminal 33 and terminal 35. Rectifiers 36 and 37 are connected between opposite ends of the secondary 27 and terminal 35 and hence produce full wave rectification of the supply current shown in FIG. 7*a*. This full wave rectified current essentially by-passes lead coil 30 through resistor 32 but passes through lag coil 28 from right to left as seen in FIG. 7*b* which locks the rotor between pulses. Switches $S_1$ and $S_2$ are preferably electronic switches closed by pulses from the outputs 18' and **18*r*** in FIG. 4 providing triggers of the type shown in FIGS. 7*d* and 7*e*. FIGS. 7*b* and 7*c* show the effect of closing the switches $S_1$ and $S_2$ successively, in each case shortly after the supply voltage goes positive, assuming that the switch allows current to pass from the point closed for only a half cycle.

Closing switch $S_1$ reverses the current flow in the lag winding 28. At the same time it puts the full transformer voltage across resistors 34 and 32 creating a positive current surge in the lead winding 30. The effect of the series capacitor is to make this surge faster, or leading, compared to the transient in the lag winding 28. At the end of the half cycle the switch $S_1$ opens, allowing the current in the lag winding 28 to resume its former positive value. Since capacitor 31 is charged positive at terminal 33, a negative transient now occurs in the lead winding 30.

It will be evident to those skilled in the art that the above described wave forms produce a rotating magnetic field similar to the action of a two phase synchronous motor, over the area of one pair of poles causing the rotor 38 to step one pair of poles each time switch $S_1$ is closed at the appropriate time to produce the deviation from the steady state first shown in FIGS. 7*b* and 7*c*. If counts occur in only one direction, as in FIGS. 2 and 5, only switch $S_1$ is required. However, if counts are to be made in two directions, as in FIG. 4, switches $S_1$ and $S_2$ are both required.

Closing switch $S_2$ produces the second set of transients in FIGS. 7*b* and 7*c* in a manner similar to the above description. However, the current in the lead winding 30 is reversed, producing a magnetic field which rotates in a direction opposite to the previously described action.

This causes the rotor to step one pair of poles in the opposite direction.

Switches $S_1$ and $S_2$ may be electronic devices which automatically open after the completion of the positive half of the supply voltage cycle such as a thyratron or silicon controlled rectifier. These devices can be turned on by the type of trigger pulses shown in FIGS. 7*d* and 7*e*. Such pulses for both positive and negative counting are provided by the circuit of FIG. 4, wherein the motor trigger pulses are derived from the forward and reverse feedback pulses sent to switches $S_1$ and $S_2$, respectively, resulting in the capability of positive and negative integration counts.

The timing pulses described for the voltage to pulse frequency converter of FIGS. 2, 4 and 5 can be derived from transformer 26 by standard clipping and differentiating techniques, thus accomplishing the necessary synchronizing the feedback pulses and the supply for the counter with the steady state motor input from the power supply. In this manner it is assured that the count trigger pulses derived from the feedback pulses will always be in synchronism with counter motor power supply.

Modifications within the scope of the present invention will occur to those skilled in the art. All such modifications within the scope of the claims are intended to be within the scope and spirit of the present invention.

I claim:

1. A voltage to pulse frequency converter comprising a direct current amplifier with capacitance feedback to form an integrating amplifier and having two input terminals, one of which provides a network summing junction, a voltage sensitive pulse source connected to an output of the integrating amplifier such that upon the occurrence of a particular voltage from the amplifier the pulse source will generate a pulse of predetermined duration and amplitude, said pulse source being coupled to a feedback path having a resistance of predetermined size to a summing junction at the summing junction input terminal of the integrating amplifier to reset the amplifier, an additional amplifier functioning as a stabilizing D.C. pre-amplifier, said additional amplifier having a relatively low response and having first and second input terminals, the first input terminal supplying a system input terminal and the second input terminal being connected to the network voltage input terminal in such a manner that said input terminal receives a voltage proportional to that at the summing junction, and the output of said additional amplifier being connected at a second input terminal of the integrating amplifier.

2. The voltage to pulse frequency converter of claim 1 in which the pulse source includes a pulse forming generator, said generator being adapted to produce a pulse having fast rising and falling leading and lagging edges, and a flat top to define a precise predetermined area under the pulse.

3. The voltage to pulse frequency converter of claim 2 in which the area under the pulse is made variable by means causing variation of the pulse amplitude.

4. The voltage to pulse frequency converter of claim 2 in which the area under the pulse is made variable by means causing variation of the pulse width.

5. The voltage to pulse frequency converter of claim 2 in which the area under the pulse is made variable by means responsive to a selected external effect.

6. The voltage to pulse frequency converter of claim 2 in which the pulse amplitude is clipped to a predetermined, controlled level by a zener diode.

7. The voltage to pulse frequency converter of claim 1 in which the pulse forming generator is a one-shot multivibrator.

8. The voltage to pulse frequency converter of claim 2 in which the pulse forming generator comprises a bistable multivibrator.

9. The voltage to pulse frequency converter of claim 2 in which the pulse source is provided with a series of timing pulses, the interval between successive timing pulses determining pulse width.

10. The voltage to pulse frequency converter of claim 9 in which successive timing pulses turn the pulse source on and off and determine thereby its pulse width.

11. The voltage to frequency converter of claim 9 in which the timing pulses are generated by a power supply.

12. The voltage to pulse frequency converter of claim 9 in which the timing pulses are generated by a variable effect dependent upon a variable affecting the integrator count.

13. The voltage to pulse frequency converter of claim 10 in which a bistable multivibrator is employed and a first timing pulse is passed by a gate rendered conductive by the predetermined voltage level to render the multivibrator conductive and the second timing pulse is bypassed around the gate to restore the multivibrator to nonconductive condition.

14. The voltage to pulse frequency converter of claim 2 in which negative and positive voltages may be fed to the amplifier as inputs and separate voltage sensitive pulse generators responding respectively only to positive and negative voltages are provided and coupled through separate resistors back to the amplifier.

15. The voltage to pulse frequency converter of claim 1 in which the pulse forming generator is a one-shot multivibrator.

16. The voltage to pulse frequency converter of claim 1 in which the pulse forming generator comprises a bistable multivibrator.

17. The voltage to pulse frequency converter of claim 1 in which the pulse source is provided with a series of timing pulses, the interval between successive timing pulses determining pulse width.

18. The voltage to pulse frequency converter of claim 17 in which the timing pulses are generated by a variable effect dependent upon variable affecting the integrator count.

19. The voltage to pulse frequency converter of claim 17 in which a bistable multivibrator is employed and a first timing pulse is passed by a gate rendered conductive by the predetermined voltage level to render the multivibrator conductive and the second timing pulse is by-passed around the gate to restore the multivibrator to nonconductive condition.

20. The voltage to pulse frequency converter of claim 1 in which negative and positive voltages may be fed to the amplifier as inputs and separate voltage sensitive pulse generators responding respectively only to positive and negative voltages are provided and coupled through separate resistors back to the amplifier.

21. The voltage to pulse frequency converter of claim 17 in which the pulses generated by said pulse source are fed to a pulse counter comprising a two phase motor in which first and second phase field windings are connected in series at a first terminal, a capacitor in series with the first field winding, a resistance in parallel with the series first winding and capacitor, between the first and second terminals, alternating current supply terminals in series with rectifiers across the series connected windings to povide direct current and a switch connecting the alternating current directly across the series connected winding to said second terminal such that the timing pulses are generated by the same alternating supply.

22. The voltage to pulse frequency converter of claim 17 in which the pulses generated by said pulse source are fed to a pulse counter comprising a two phase motor in which first and second phase field windings are connected in series at a first terminal, a capacitor in series with the first field winding, a resistance in parallel with the series first winding and capacitor, between the first and second terminals, alternating current supply terminals in series with rectifiers across the series connected windings to provide direct current and a switch connecting the alternating current directly to said first terminal.

23. The voltage to pulse frequency converter of claim 17 in which the pulses generated by said pulse source are fed to a pulse counter comprising a two phase motor in which first and second phase field windings are connected in series at a first terminal, a capacitor in series with the first field winding, a resistance in parallel with the series first winding and capacitor, between the first and second terminals, alternating current supply terminals in series with rectifiers across the series connected windings to provide direct current and a switch connecting the alternating current directly across the series connected winding to said second terminal and a second switch connecting the alternating current to the first terminal.

References Cited by the Examiner

UNITED STATES PATENTS

| | | | |
|---|---|---|---|
| 2,364,421 | 12/1944 | Bousman | 318—254 |
| 2,717,310 | 9/1955 | Woodruff | 328—127 |
| 2,774,026 | 12/1956 | Towner | 318—341 X |
| 2,809,339 | 10/1957 | Guggi | 318—327 |
| 2,837,670 | 6/1958 | Thomas et al. | 310—49 |
| 2,851,620 | 9/1958 | Hausen | 310—49 |
| 2,863,108 | 12/1958 | Raffensperger | 318—341 X |
| 2,863,122 | 12/1958 | Finkel et al. | 332—16 |
| 2,864,556 | 12/1958 | Raymond | 235—183 |
| 2,870,412 | 1/1959 | Hern | 332—16 |
| 2,885,662 | 5/1959 | Hansen | 328—127 X |
| 2,891,725 | 6/1959 | Blumenthal et al. | 235—183 |
| 2,898,533 | 7/1959 | Beckett | 318—341 X |
| 2,903,185 | 9/1959 | Myers | 235—154 X |
| 3,005,940 | 10/1961 | Johnson | 318—341 X |
| 3,008,075 | 11/1961 | Scott | 318—341 X |
| 3,040,273 | 6/1962 | Boff | 328—127 X |
| 3,048,336 | 8/1962 | Ritzenthaler | 235—183 |
| 3,165,686 | 1/1965 | MacDonald | 318—171 X |

ORIS L. RADER, *Primary Examiner.*

ALFRED L. BRODY, WALTER W. BURNS, *Examiners.*

T. LYNCH, B. D. REIN, *Assistant Examiners.*